United States Patent [19]

Payet

[11] 4,159,365

[45] Jun. 26, 1979

[54] POLYPHENYL-1,4-PHENYLENE TEREPHTHALATES AND FIBERS THEREFROM

[75] Inventor: Charles R. Payet, Wilmington, Del.

[73] Assignee: E. I. Du Pont de Nemours and Company, Wilmington, Del.

[21] Appl. No.: 838,741

[22] Filed: Oct. 5, 1977

Related U.S. Application Data

[63] Continuation-in-part of Ser. No. 743,319, Nov. 19, 1976.

[51] Int. Cl.² ............................................. D02G 3/00
[52] U.S. Cl. ............................ 428/364; 264/210 F; 428/480; 528/176
[58] Field of Search .................. 428/364, 395, 480; 260/47 C; 264/210 F; 528/176

[56] References Cited

U.S. PATENT DOCUMENTS

| | | | |
|---|---|---|---|
| 2,595,343 | 5/1952 | Drewitt et al. | 260/47 C |
| 3,160,602 | 12/1964 | Kantor et al. | 260/47 C |
| 3,160,603 | 12/1964 | Holub et al. | 428/379 X |
| 3,160,604 | 12/1964 | Holub et al. | 427/120 X |
| 3,160,605 | 12/1964 | Kantor et al. | 260/47 C |
| 3,234,167 | 2/1966 | Sweeney | 260/47 C |
| 3,549,593 | 12/1970 | Takekoshi | 260/47 C |
| 3,733,306 | 5/1973 | Wolfes et al. | 260/47 C |
| 3,939,117 | 2/1976 | Ueno | 260/47 C |
| 3,975,487 | 8/1976 | Cottis et al. | 264/210 F |
| 3,991,013 | 11/1976 | Pletcher | 260/47 C |
| 3,991,014 | 11/1976 | Kleinschuster | 260/47 C |
| 4,064,108 | 12/1977 | Inata et al. | 260/47 C |
| 4,066,620 | 1/1978 | Kleinschuster | 260/47 C |
| 4,067,852 | 1/1978 | Calundann | 260/47 C |
| 4,075,262 | 2/1978 | Schaefgen | 260/47 C |

FOREIGN PATENT DOCUMENTS 2520819 11/1975 Fed. Rep. of Germany.
2520820 11/1975 Fed. Rep. of Germany.

*Primary Examiner*—Lorraine T. Kendell

[57] ABSTRACT

This invention relates to novel fiber-forming polyesters which in fiber form have high tenacity and high retention of tensile strength at elevated temperatures and to methods for making such polyesters. Fiber preparation and heat treatment are also disclosed.

10 Claims, 2 Drawing Figures

POLYPHENYL-1,4-PHENYLENE TEREPHTHALATES AND FIBERS THEREFROM

COPENDING RELATED APPLICATION

This application is a continuation-in-part of my application Ser. No. 743,319, filed Nov. 19, 1976.

BACKGROUND OF THE INVENTION

A class of polyesters having certain advantages over polyethylene terephthalate is disclosed in German OS No. 2,520,819 (Schaefgen). These polyesters exhibit optical anisotropy in the molten state and can be melt spun into fibers which on heat treatment by techniques disclosed in German OS No. 2,520,820 (Luise) increase in tenacity. Such heat treated polyester fibers are suggested for use in tire cords and in other industrial and consumer products where the high strength permits use of less yarn with its attendant economic and other advantages. In such end-use applications, particularly in truck tires, exceptionally high temperatures, e.g. in excess of 150° C., may be encountered. Therefore it is important that the yarn of the cord be of high strength at room temperature and also possess high strength at such elevated temperatures. Yarns from polyesters of the present invention satisfy this requirement.

SUMMARY OF THE INVENTION

This invention provides novel polyesters of fiber-forming molecular weight consisting essentially of recurring units of the following formulas:

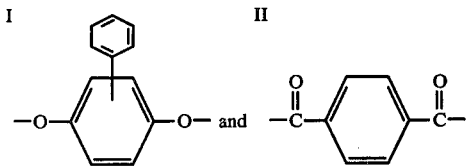

and of from 0 to 10 mol % (based on total mols of units) of other aromatic or cycloaliphatic polyester-forming units, as well as fibers, films and molded articles thereof.

The fiber-forming polyesters are optically anisotropic in the melt, are melt spinnable and exhibit an inherent viscosity of at least 0.7, measured as described hereinafter. The fibers formed therefrom may be heat treated to yield fibers with tenacity in excess of 18 grams per denier and a retention of at least 65% of such tenacity at 150° C.

DRAWINGS

DETAILED DESCRIPTION OF THE INVENTION

Figure 1:
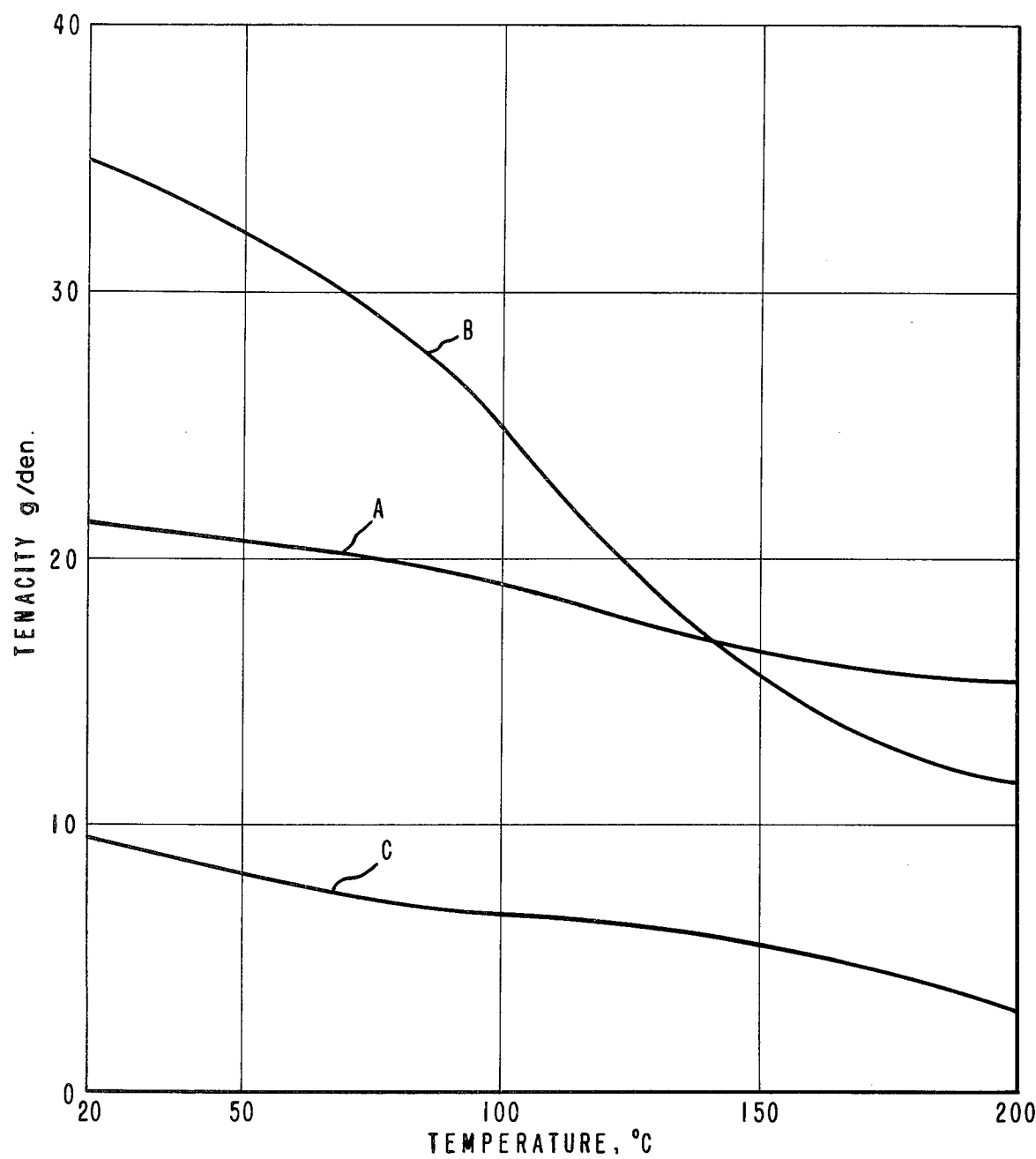
FIG. 1 is a plot of tenacity (grams per denier) vs. temperature (°C.) for yarn of a polyester of the invention (Curve A) and for yarn of two controls, namely the polymers of Examples 2 and 3, Curves B and C, respectively. The control polymers are mentioned in German OS No. 2,520,819.
Figure 2:
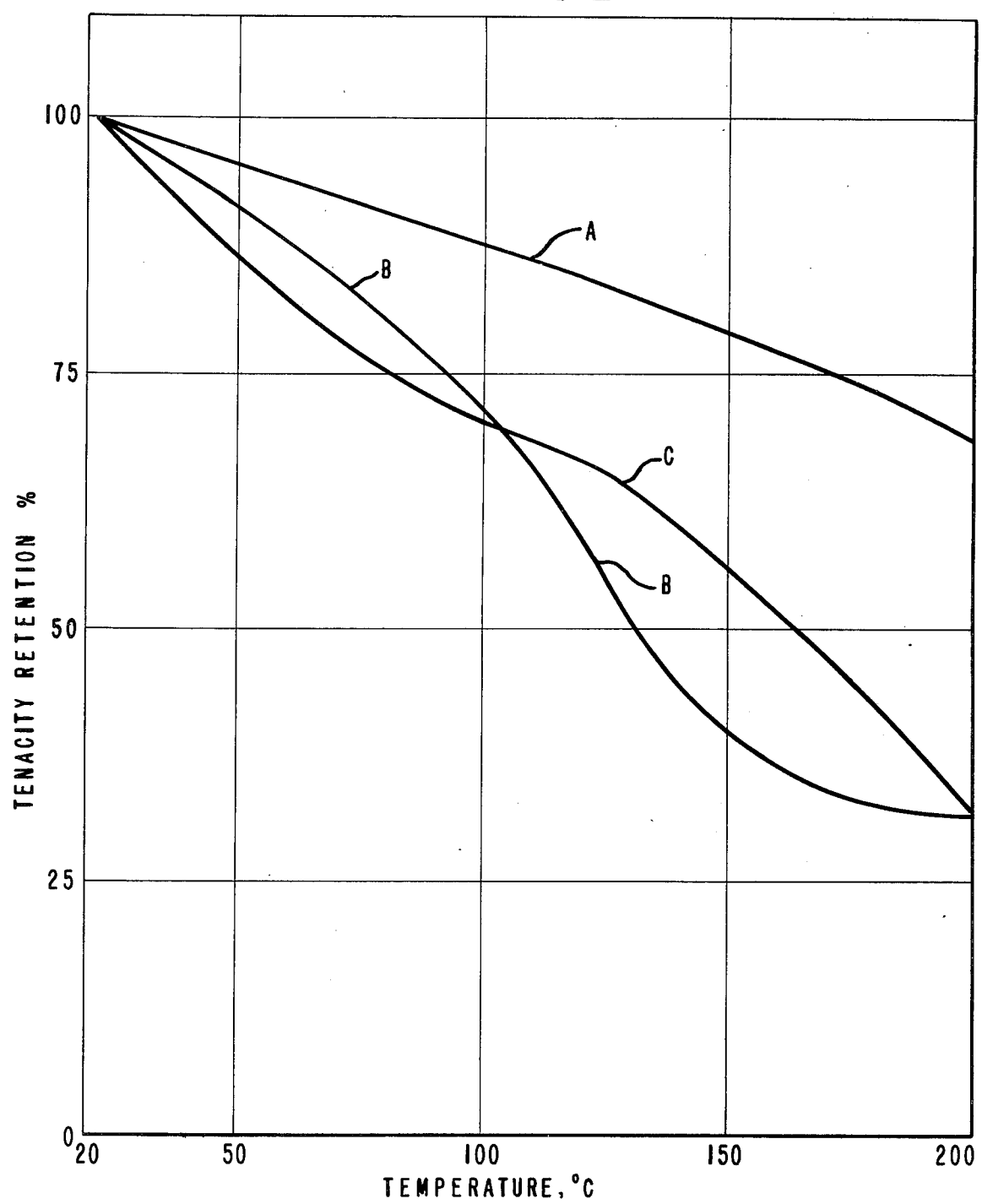
FIG. 2 is a plot of tenacity retention (%) vs. temperature (°C.) for the same set of polymers.

The polyesters of the invention may be prepared, spun and the fibers heat treated to increase tenacity by the general procedure shown in German OS Nos. 2,520,819 and 2,520,820 and specifically illustrated in Examples 1 and 4-8 herein.

The novel polyesters are prepared from phenylhydroquinone and terephthalic acid or their functionally equivalent derivatives. If comonomer reactants are to be employed, they too may be added as their functionally equivalent derivatives. Among such comonomers may be mentioned resorcinol, isophthalic acid, hydroquinone, p-hydroxybenzoic acid, and 4,4'-dihydroxybiphenyl which provide the following repeating units, respectively:

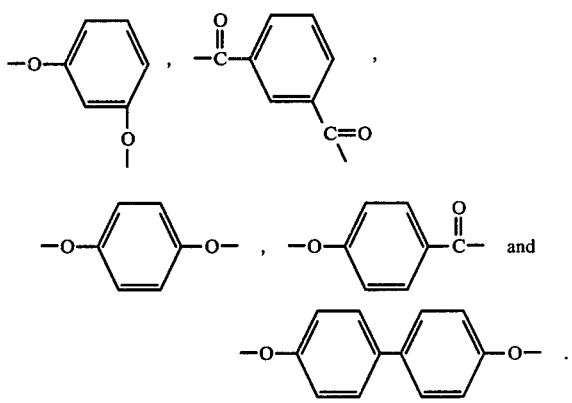

Mixtures of comonomers, such as hydroquinone and resorcinol may also be used. The presence of comonomer units depresses the melting point as would be expected and may assist in melt-spinning and processing. In some instances additional advantages are obtained such as filament abrasion resistance, filament adhesion to rubber, etc. The fibers of the invention that are made from a homopolymer are of particular economic advantage over a copolymer since fewer reactants are required to make the homopolymer.

The term "consisting essentially of" is intended to have its customary meaning: namely, that all specified materials and conditions are very important in practicing the invention but that unspecified materials and conditions are not excluded so long as they do not prevent the benefits of the invention from being realized.

Melt polymerization, preferably under anhydrous conditions in an inert atmosphere, is used for the polymer synthesis. Generally, polymerization is continued until the polyester has a molecular weight sufficient for fiber formation. Inherent viscosities of at least 0.7, measured as described hereinafter, are useful for preparation of shaped articles.

The novel polyesters exhibit optical anisotropy in the molten state as determined by the technique shown in German OS No. 2,520,819. The polyesters have excellent thermal stability in the molten state and may be readily formed into fibers, films, bars or other shaped objects. While within the scope of but not specifically mentioned in the aforementioned German OS Nos. 2,520,819 and OS 2,520,820, the heat treated fibers of this invention are unusual in that they possess both high strength and excellent strength retention at 150° C. The novel heat treated polyester fibers of the invention have tenacities in excess of 18 grams per denier and retain at least 65%, more preferably at least 70% of such tenacity at 150° C. Bars of the polymers of the invention exhibit high torsion modulus at elevated temperatures and high heat deflection temperatures (heat deflection temperatures measured by A.S.T.M. D648 at 264 psi on a single injection molded bar.)

Retention of tenacity and modulus in fiber at elevated temperatures in the range of 100°–200° C. is important in a number of reinforcing applications, e.g., in tires [R. E. Wilfong and J. Zimmerman, J. Applied Polymer Sci., 17, 2039–2051 (1973)], where heat buildup and high operating temperatures to 150° C. are frequently encountered, particularly in truck tires, [F. S. Conant, Rubber Chem. and Technology, 44, 397–439 (1971) and P. Kainradl, G. Kaufmann and F. Schmidt, Kautschuk and Gummi-Kunststoffe 19, 27–36 (1966)] and in such other applications as clutch facings, brake linings, conveyor belt reinforcement in glass manufacture, ropes and cables in sucker rods for oil well use. It is also important that the fibers possess high tenacity at elevated temperatures since yarn tenacity determines the amount of yarn needed for the truck tires or for reinforcement in other high temperature applications. The heat treated fibers of this invention are particularly useful for these purposes since they have a high retention of tensile properties at elevated temperatures as well as high absolute tensile values at elevated temperatures.

It should be recognized that filaments of lower strength than demonstrated herein have been obtained. It is believed that careful and thorough mixing of reactants during polymerization is at least partly responsible for the higher properties. Proportions and identity of the comonomer may also affect the properties. Other factors may be purity of ingredients and the particular heat treatment conditions selected.

Preparation of Shaped Articles

For fiber preparation, the molten polymer mass, obtained either directly from the melt polymerization of the polymer-forming ingredients or via the melting of polymer, is processed, e.g., through a melt spinning unit and extruded through a spinneret into a quenching atmosphere (e.g., air maintained at room temperature) and wound up.

Fibers may be melt spun in a conventional fashion from single or multi-hole spinnerets. In the melt spinning cell, the melt zone temperature can be in the range of from about 310° C. to about 370° C., depending on the sample. Higher temperatures are used for samples exhibiting higher inherent viscosities or higher flow temperatures. Similarly, spinneret temperatures can be in the range of from about 320° C. to about 375° C., depending on the melt zone temperature and the melt viscosity of the polymer. Filter packs may be employed in the spinneret assembly. The as-spun fibers may be wound up over a broad range of speeds, preferably from 100 m/min to 4,500 m/min. The as-spun fibers are oriented, having orientation angles of less than 65°, preferably less than 25°, measured as described herein.

Films may be prepared by melt-pressing or melt extrusion techniques. Exceptionally tough bars may be prepared by injection molding. The relatively low viscosity of the melts is an advantage in processing.

When heat treating the yarns, it is often desirable to coat them with graphite or other inert material to help prevent contacting fibers from adhering to each other.

Fiber samples as skeins or on bobbins may be heated in an inert atmosphere (e.g., nitrogen) under a variety of conditions. Heating is normally conducted for from about 30 minutes to 4 hours or longer at a maximum temperature close to but below the filament fusion point. Interfilament fusion should be avoided so that the yarns are rewindable. It is preferred that the maximum temperature be reached in a stepwise or slow continuous fashion.

When the fiber samples are wound on bobbins, it is preferred that a soft, yielding surface be present on the bobbin, e.g., a covering of Fiberfrax ® (batted ceramic insulation of the Carborundum Company). The inert atmosphere within the oven or other heat-treating chamber is changed during the treating period by causing a flow of the inert gas (e.g., nitrogen) to enter and to leave the oven at a rate sufficient to remove by-products from the vicinity of the fiber.

As can be seen from the figures, the heat treated fiber of Example 1 (Curve A), a fiber of the invention, has a tenacity that is high, that is greater at 150° C. than that of heat treated fibers of Example 2 (Curve B) or Example 3 (Curve C) and has lost significantly less of its strength at the elevated temperatures than have the other fibers. Moreover, as shown in Examples 7 and 8 8 of the invention) the absolute value of tenacity at 150° C. is substantially higher than that of the controls, (Ex. 2 and 3). It will be noted that the fibers of Examples 7 and 8 are of higher tenacity than that of Example 1 while the % retention of tensile tenacity has remained at a high level.

Measurements

Inherent Viscosity: Inherent viscosity ($\eta$inh) as reported herein is defined by the following equation:

$$\eta\text{inh} = \ln(\eta\text{rel})/C$$

wherein ($\eta$rel) represents the relative viscosity and C represents a concentration of 0.5 gram of the polymer in 100 ml. of solvent. The relative viscosity ($\eta$rel) is determined by dividing the flow time in a capillary viscometer of a dilute solution of the polymer by the flow time for the pure solvent. The dilute solutions used herein for determining ($\eta$rel) are of the concentrtion expressed by (C), above; flow times are determined at 30° C., the solvent is 1,1,1,3,3,3-hexafluoroisopropanol/chloroform (50/50, vol/vol).

Tensile Properties: Yarn tensile properties are measured with an "Instron" Universal Testing Instrument (Instron Corporation, Canton, Mass.) provided with an "Instron" Environmental Chamber System for tests at above ambient temperature. Specimens to be tested are conditioned at least one hour at 70° F. and 65% relative humidity. Yarns are twisted 3 turns per inch (or as indicated), Z twist, at 0.1 gram per denier tension. Denier, Den., is determined as in U.S. Pat. No. 3,869,429. The same yarn denier is used for ambient and higher temperature testing to determine property retention at elevated temperatures for a given fiber. The twisted yarn is mounted with "Instron" 4C clamps such that the gage length of yarn (distance between jaws) is 10.0±0.1 inches (25.4± 0.25 cm). Ambient temperature testing is made in the fiber conditioning environment. Higher temperature testing is made by enclosing yarn and clamps in the Environmental Chamber controlled at the desired temperature. Such specimens are held in the chamber for three minutes before testing. Testing is conducted by elongating yarn specimens to break at a constant rate of extension of 50% per min. based on the fiber gage length. The stress-strain curve is plotted automatically on the "Instron" recorder and/or the load/elongation data are fed into a computer. From these data or the stress-strain curve, the *breaking tenacity*, T, is computed as grams per denier, *elongation, E,* as increase in length at break, expressed as a percentage of the nominal gage length, and *initial modulus*, Mi, as grams per denier from the slope of a line drawn tangent to the initial linear part of the stress-strain curve. These terms and their calculation are further defined in A.S.T.M. D2101, Part 25, 1968. Average values computed from two or more breaks are reported.

Orientation Angle—OA° (arc°) indicate the orientation angle and (2θ specific arc) as in U.S. Pat. No. 3,671,542, and were measured by method (2) therein.

In the examples which follow, the periods given for fiber heat treatment include both the time and used to arrive at the indicated temperature and the time the fiber is maintained at that temperature.

EXAMPLE 1

This example illustrates preparation of poly(phenyl-1,4-phenylene terephthalate), i.e. consisting only of

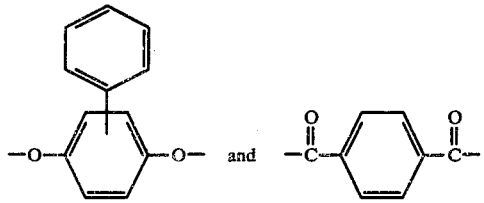

units in substantially equimolar amounts, and strong fibers thereof. These fibers exhibit exceptionally high levels of tensile tenacity retention at elevated temperatures.

In a 250-ml. three-neck, round-bottom flask equipped with a stirrer, nitrogen inlet port, distillation head, and a collection vessel, are placed 54.0g(0.2 mole) of phenylhydroquinone diacetate and 31.6 g (0.19 mole) of terephthalic acid. The reaction vessel is thrice evacuated and purged with dry nitrogen. The reaction vessel is placed in a Woods metal bath at 290° C., stirring is begun and a nitrogen flow maintained. In about 13 min., the first acetic acid is collected. Twenty minutes later the bath temperature is raised to 300° C. After an additional 27 min., the temperature of the bath is raised to 310° C.; in another 40 min. to 320° C.; in another 35 min. to 340° C. After 23 min. more, the nitrogen flow is halted and the reaction system placed under vacuum, all at 340° C. After 8 min. more, the pressure is reduced to about 10 mm Hg. Two min. later the vacuum is released with nitrogen, stirring is stopped and the molten polymer is allowed to cool under nitrogen. The yield is 56 g; ηinh=1.03.

A plug of this polymer is melt spun into air through a multi-hole spinneret [spinneret hole diameter=0.023 cm., melt-zone temperature (MZT)=341°–343° C., spinneret temperature=346° C.] and the resulting yarn wound up at 457 m./min.

Three bobbins of yarn are collected, and are plied together to form a yarn of about 400 denier which exhibits T/E/Mi=3.4/0.9/408, O.A.=14° (20.3°).

A portion of the plied yarn is wound on a Fiber-Frax ®-covered bobbin (in excess of one layer) and heated in a nitrogen-swept oven under the following successive conditions: room temperature —230° C./1.5 4 230°–275° C./1.5 hr., 275°–295° c./1.5 hr., 295°–312° C./1.5 hr., 312°–325° C./12.5 hr. The bobbin is allowed to cool and these yarn properties are observed at room temp.: T/E/Mi/Den.: 21.4/3.5/546/371. Portions of this yarn are tested for tensile strength retention at elevated temperatures by the procedure previously described under "Measurements" with the following results:

TABLE I

| Test Temperature, °C. | Breaking Tenacty At Test Temp. | % Retention Of Original Breaking Tenacity |
|---|---|---|
| 21 | 21.4 | 100 |
| 100 | 18.9 | 88 |
| 125 | 17.4 | 81 |
| 150 | 17.1 | 80 |
| 175 | 15.6 | 73 |
| 200 | 15.2 | 71 |

EXAMPLE 2—CONTROL

This example illustrates that fibers of copoly (chloro-1,4-phenylene terephthalate/2,6-naphthalate)(70/30, mole basis) are inferior to the fibers of this invention in retention of tensile tenacity at elevated temperature.

Copoly(chloro-1,4-phenylene terephthalate/2,6-naphthalate)(70/30, mole basis) is prepared and spun into fibers by methods similar to those described in German OS No. 2,520,819 to yield an as-spun yarn having these properties: T/E/Mi/Den.: 7.0/1.8/533/499 measured on yarn with 3.6 turns/inch, Z-direction. A yarn sample collected on a different bobbin during the same spinning operation is wrapped on a Fiber-Frax ®-covered bobbin and heat treated in a nitrogen-swept oven under these successive conditions: 220° C./1 hr.; temperature raised to 260° C. and held thereat for 1 hr.; temperature raised to 285° C. and held thereat for 1 hr.; temperature raised in 0.4 hr. to 300° C. and held thereat for 12 hr. The bobbin is allowed to cool and these properties are observed at room temperature: T/E/Mi/Den.: 34.9/4.7/597/419. Portions of the heat treated yarn are tested for tensile strength retention at elevated temperatures as in Example 1 with the following results.

TABLE 2

| Test Temperature, °C. | Breaking Tenacity At Test Temp. | % Retention Of Original Breaking Tenacity |
|---|---|---|
| 21 | 34.9 | 100 |
| 100 | 25.1 | 72 |
| 125 | 19.4 | 56 |
| 150 | 13.7 | 39 |
| 175 | 11.1 | 32 |
| 200 | 11.5 | 33 |

EXAMPLE 3—CONTROL

This example illustrates that fibers of poly(chloro-1,4-phenylene hexahydroterephthalate) are inferior to the fibers of this invention in retention of tensile strength at elevated temperatures.

Poly(chloro-1,4-phenylene hexahydroterephthalate) is prepared from chlorohydroquinone diacetate and hexahydroterephthalic acid and spun into fibers, all by methods similar to those described in German OS No. 2,520,819. The as-spun yarn is plied 6× to give a yarn with T/E/Mi/Den.=3.2/1.7/206/110 (measured on yarn with three turns/inch, Z-direction). A sample of the plied yarn is wrapped on a Fiber-Frax ®-covered bobbin and heat treated in a nitrogen-swept oven under these successive conditions: 170° C./1 hr.; temperature raised to 230° C./1 hr.; temperature raised to 260° C./2 hr.; temperature raised to 290° C. and held thereat for 2¼ hr. The bobbin is allowed to cool and these properties are observed at room temperature: T/E/Mi/Den.=9.3/2.0/389/105. Portions of the heat treated yarn are tested for tensile tenacity retention at elevated temperatures as in Example 1 with the following results:

TABLE 3

| Test Temperature, °C. | Breaking Tenacity At Test Temp. | % Retention Of Original Breaking Tenacity |
| --- | --- | --- |
| 21 | 9.3 | 100 |
| 100 | 6.6 | 71 |
| 125 | 6.2 | 67 |
| 150 | 5.2 | 56 |
| 175 | 4.2 | 45 |
| 200 | 3.0 | 32 |

EXAMPLE 4

This example shows that substitution of 8.1 mol % of p-hydroxybenzoic acid derived units for part of the phenyl-1,4-phenylene terephthalate units in poly(phenyl-1,4-phenylene terephthalate) gives yarn with high tenacity and high tenacity retention at 150° C.

A mixture of 663 g (2.45 moles) of phenylhydroquinone diacetate (7 mole % excess), 381 g (2.29 moles) of terephthalic acid and 73 g (0.40 moles) of p-acetoxybenzoic acid is placed in a 2-liter resin kettle equipped with an efficient corrosion resistant metal stirrer, nitrogen inlet port, and fractionation column with condenser and variable take-off head. The kettle is purged several times by evacuation and filling with nitrogen and then is placed in a Woods metal bath at 195° C. The bath and kettle are heated at atmospheric and then at reduced pressure, the reaction is stirred and the acetic acid reaction product is collected. The temperature of the reaction mixture is monitored by a sheathed thermocouple in the melt. Nitrogen flow at 1 ft³/min is maintained and slowly diminished to zero as the kettle is evacuated. As the polymerization progresses, the following temperatures (°C.)/elapsed times (min)/pressures (mm of Hg) are observed: 148/15/760, 274/26/760, 336/74/380, 341/76/250, 343/78/120, 343/80/50, 344/82/1-5, 348/93/1-5. After 93 minutes, the reaction mixture is cooled, and the kettle is broken to free the polymer, which then is cut to a size that will pass through an one-eighth inch mesh screen. The polymer is then subjected to a purification procedure. It is agitated with 10 wt. % aqueous (NH$_4$)$_2$CO$_3$ solution and collected and then washed in turn with distilled water, 10% aqueous acetic acid, water, acetone, refluxing acetone, (while stirring), additional acetone, and then is dried at 115° C. at reduced pressure. Purification is found to improve spinning performance. The yield is 662 g (86%) of polymer with a $\eta_{inh}$ of 2.12.

The polymer is redried for several hours at 110° C. at reduced pressure and transferred to and spun from an one inch single screw extruder equipped with a pump block and filter pack assembly and a 100 hole spinneret, each hole with a diameter of 0.013 cm. The temperature in the screw fed zone is adjusted so that the polymer melts (maximum temperature in block is about 350° C.) and is uniformly fed to the spinneret (maintained at about 345° C.) and extruded at a throughput of 12.4 g/min. The yarn take-up rolls rotate at a surface speed of 220 m./min. The yarn then is passed through an air jet to consolidate it and wound up on a shaft driven bobbin taking care to avoid mechanical damage to the yarn. The yarn exhibits a T/E/Mi/den of 6.1/1.6/400/496 (at 3.6 turns/inch); Q.A.=16° (20.1°).

A circular skein of yarn is heat-treated in an oven purged with nitrogen (with exclusion of air) at these temperatures (°C.)/times (hrs): gradually from 25-200/1.3, slowly from 200-308/4.0, 308/12, cooled from 308-25/1.3. The heat-treated yarn exhibits T/E/Mi/den of 24.8/4.3/485/486 (at 3.7 turns/inch). At 150° C. it exhibits T/E/Mi/den of 18.9/3.8/335/487. Tenacity retention is 76%. Some sticking is observed between individual filaments.

EXAMPLE 5

This example shows that substitution of 2.5 mol % of resorcinol derived units for part of the phenylhydroquinone derived units in poly(phenyl-1,4-phenylene terephthalate) gives yarn with high tenacity and high tenacity retention at 150° C.

This polymer is prepared essentially by the method of Example 4 from 741 g. (2.74 moles) of phenylhydroquinone diacetate, 28 g (0.14 mole) of resorcinol diacetate, and 448 g (2.70 moles) of terephthalic acid to obtain 784 g (93%) of product with an $\eta_{inh}$ of 1.54. The total time of polymerization is 76 minutes, 16 minutes of which is at reduced pressure and at 338° C.-341° C.

This and a similar preparation ($\eta_{inh}$ of 1.66) of extracted, washed and dried polymer are physically blended, dried and then spun in the extruder of Example 4 under similar conditions; spinneret temperature is 335° C. The yarn exhibits T/E/Mi/den of 6.3/1.7/434/531.

A skein of this yarn is heat-treated as in Example 4 at these temperatures (°C.)/times (hrs): 25-200/2, 200-312/5.3, 312/6.7, 312-25/2.7. The heat-treated yarn exhibits a T/E/Mi/den of 29.7/4.4/559/506. At 150° C. it exhibits T/E/Mi/den of 22.9/3.8/392/510.

EXAMPLE 6

This example shows formation of yarn with high tenacity and high tenacity retention at 150° C. from a copolymer of poly(phenyl-1,4-phenylene terephthalate) in which 5 mole % of the terephthalic acid derived units are replaced with units derived from trans-hexahydroterephthalic acid.

This polymer is prepared essentially by the method of Example 4 from 780 g (2.89 moles) of phenylhydroquinone diacetate, 426 g (2.56 moles) of terephthalic acid and 23.2 g (0.135 mole) of trans-hexahydroterephthalic acid. The polymerization is conducted for 66 minutes, 18 minutes of which is at 334° C.-344° C. under reduced pressure. The yield is 790 g (93%) of polymer with an $\eta_{inh}$ of 1.76.

The polymer is dried and then spun in the extruder of Example 4 under similar conditions. The yarn exhibits a T/E/Mi/den of 6.3/1.6/420/493 (3.6 turns/inch); O.A. 16° (20.1°).

A skein of this yarn is heat-treated as in Example 5. The heat-treated yarn exhibits T/E/Mi/den of 23.0/3.4/602/483. At 150° C. it exhibits T/E/Mi/den of 16.8/3.0/335/489.

EXAMPLE 7

This example shows the preparation of poly(phenyl-1,4-phenylene terephthalate) yarn with high tenacity and high tenacity retention at 150° C. from phenylhydroquinone and terephthalic acid.

In a 2-liter resin kettle with a dome shaped lid and heated fractionation column equipped otherwise as in Example 4 is placed 545 g (2.93 moles-3 mole % excess)

of phenylhydroquinone, 471.4 g (2.84 moles) of terephthalic acid and 0.01 g of titanium tetramethoxide cyclic sulfone (aids in returning monomers and oligomers to the polymerization). The heated column and dome shaped lid aid in separating the monomers, particularly the phenylhydroquinone, efficiently from the water reaction product. The reaction is conducted with a nitrogen purge in a manner similar to Example 4 at the following temperatures (°C.)/elapsed times (min)/pressures (mm of Hg): 220/12/760, 276/32/760, 324/60/760, 326/85/630, 324/100/510, 329/115/380, 332/130/250, 336/145/120, 338/160/~5, 336/184/2, 338/228/2, 340/247/2. After 255 minutes, the reaction is cooled, the polymer isolated, cut into small pieces and extracted essentially as in Example 4. The yield is 591 g (66%) of polymer with an $\eta_{inh}$ of 161.

The polymer is dried and then spun as in Example 4; spinneret temperature is 354° C., throughput is 9.7 g/min. The yarn is collected at 165 m/min. and exhibits a T/E/Mi/den of 5.6/1.5/428/511 (3.6 turns/inch); O.A.=17° (20.1°).

A skein of yarn is heat-treated as in Example 4 at these temperatures (°C.)/times (hrs): 25-200/1.3, 200-316/10, 316/6, 316-25/1.3. The heat-treated yarn exhibits T/E/Mi/den of 22.3/3.6/573/490 (3.6 turns/inch). At 150° C. it exhibits a T/E/Mi/den of 18.2/3.3/394/488.

EXAMPLE 8

This example illustrates preparation of poly(phenyl-1,4-phenylene terephthalate) fibers with exceptionally high levels of tenacity at 150° C.

This polymer is prepared essentially by the method of Example 4 from 780 g (2.89 moles) of phenylhydroquinone diacetate and 448 g (2.70 moles) of terephthalic acid to obtain 760 g (89%) of product with an $\eta_{inh}$ of 1.8. The total time of polymerization is 90 minutes, 20 minutes of which is at reduced pressure and at 343° C.-366° C. The polymer is isolated, ground up, and purified by passing a stream of heated nitrogen (250° C.) upward through the finely divided polymer in a column for two hours.

This and four similar preparations are physically blended, dried, pelletized, then spun essentially as in Example 4 but through a 70 hole spinneret; throughput is 9.9 g/min; take-up roll speed is 256 m./min. The oriented yarn exhibits T/E/Mi/den of 5.8/1.3/473/342 (4.4 turns/inch).

A skein of yarn is heat-treated as in Example 4 at these temperatures (°C.)/times (hr) = 25-200/2, 200-317/10.7, 317/3.3, 317-25/2. The heat-treated yarn exhibits T/E/Mi/den of 28.4/3.4/710/335 (4.4 turns/inch). At 150° C. it exhibits T/E/Mi/den of 21.5/3.2/421/347.

I claim:

1. A melt spinnable polyester of fiber-forming molecular-weight consisting essentially of recurring units of the formulas

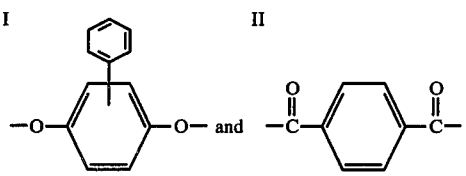

and of from 0 to 10 mol % based on total mols of units of other aromatic or cycloaliphatic polyester-forming units.

2. A polyester of claim 1 consisting essentially of recurring units of the formulas

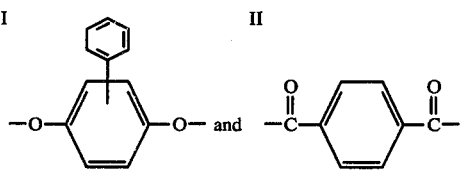

3. A polyester according to claim 1 wherein the other aromatic polyester forming unit is

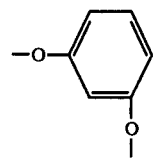

4. A shaped article of the polyester of claim 1.

5. A shaped article according to claim 4 in the form of a fiber.

6. A shaped article according to claim 4 in the form of a film.

7. A shaped article according to claim 4 in the form of an injection molded bar.

8. A heat treated fiber of the polyester of claim 2 having a tenacity of at least 18 grams per denier and at least a 65% retention of tensile tenacity at 150° C.

9. The fiber of claim 8 having at least a 70% retention of tensile tenacity at 150° C.

10. A heat-treated fiber of a polyester according to claim 1 having a tenacity of at least 18 grams per denier and at least a 65% retention of tensile tenacity at 150° C.

* * * * *

UNITED STATES PATENT OFFICE
CERTIFICATE OF CORRECTION

PATENT NO. : 4,159,365          Page 1 of 2

DATED : June 26, 1979

INVENTOR(S) : Charles R. Payet

It is certified that error appears in the above-identified patent and that said Letters Patent are hereby corrected as shown below:

Abstract, line 3, delete "tensile strength" and insert -- tenacity --.

Column 1, line 41, after "on" and before "total" delete -- , --.

Column 4, line 18, delete "8" (second instance) and insert -- (products --.

line 23, after "of" and before "tenacity" delete -- tensile --.

Column 5, line 12, after "time" and before "used" delete -- and --.

line 31, after "of" and before "tenacity" delete -- tensile --.

line 63, after "230°C./1.5" insert -- hr. --.

line 64, at the beginning of the line, delete -- 4 --.

Column 6, line 20, after "of" and before "tenacity" delete -- tensile --.

UNITED STATES PATENT OFFICE
CERTIFICATE OF CORRECTION

PATENT NO. : 4,159,365          Page 2 of 2
DATED : June 26, 1979
INVENTOR(S) : Charles R. Payet It is certified that error appears in the above-identified patent and that said Letters Patent are hereby corrected as shown below:

Column 6, lines 37 and 55, delete "tensile strength" and insert -- tenacity --.

Column 7, line 4, delete the word -- tensile --.

Column 8, line 2, delete "Q.A." and insert -- O.A. --.

Column 9, line 2, after "tetramethoxide" and before "cyclic" insert -- in 90 ml tetramethylene --.

Column 10, line 16, enclose the phrase "based on total mols of units" in parentheses.

lines 50, 52 and 55, after "of" and before "tenacity" delete -- tensile --.

Signed and Sealed this

Eighteenth Day of December 1979

[SEAL]

Attest:

SIDNEY A. DIAMOND

Attesting Officer      Commissioner of Patents and Trademarks